Dec. 2, 1969   H. J. ROSENBERG   3,481,659
MICROSCOPE SLIDE
Filed Oct. 20, 1965
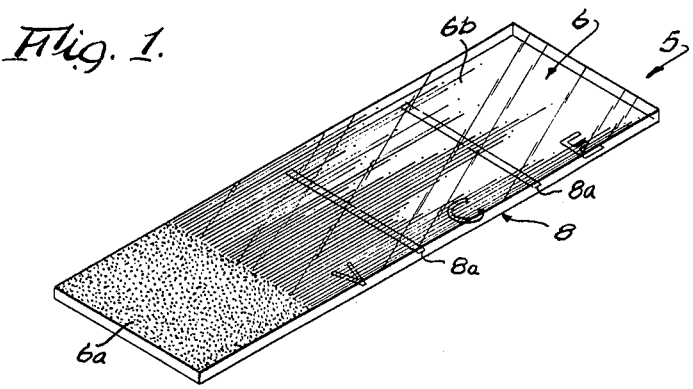
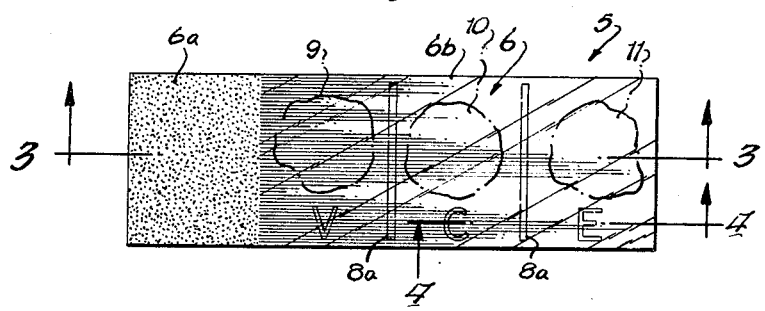
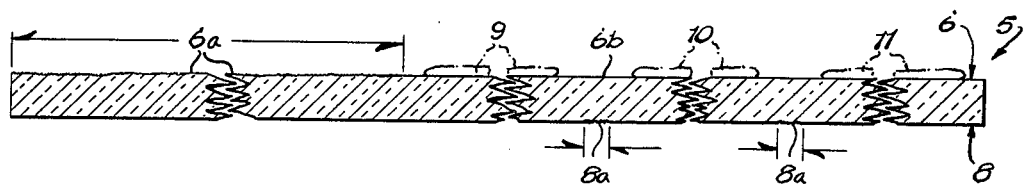
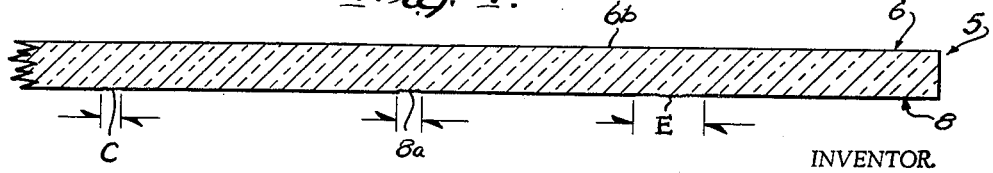
INVENTOR.
Harold James Rosenberg
BY
Popp and Sommer
ATTORNEYS 3,481,659
MICROSCOPE SLIDE
Harold James Rosenberg, 41 High Park Blvd.,
Eggertsville, N.Y.
Filed Oct. 20, 1965, Ser. No. 498,563
Int. Cl. G02b 21/34; G01n 21/16
U.S. Cl. 350—94                                    2 Claims

ABSTRACT OF THE DISCLOSURE

A microscope slide including a flat transparent strip having on its obverse side areas adapted to receive fluid specimens, and an additional area at one end of the strip provided with a rough integral surface capable of being written on to identify the strip, and such strip having on its reverse side a plurality of indicia in the form of integral rough frosted surfaces including stripes delineating such specimen receiving areas and symbols for locating the specimens, such indicia being visible through the strip and not be obscured by the material of the specimen.

---

This invention relates to a microscope slide, and more particularly to one used for examining different fluid specimens, such as cytology smears, translucent albumin and various other transparent, transulcent, or semi-opaque specimens, in a microscope.

Such slides are usually in the form of flat transparent glass strips having a plurality of areas which carry indicia in the form of frosted or roughened surfaces delineating the areas on which the specimens should be placed and/or naming, as by suitable symbols, the specific specimen to be placed in each such area. Such strips usually also have additional frosted or roughened areas capable of being written on to identify the particular slide.

In practice, when such frosted or roughened surface indicia, in the form of stripes separating areas or symbols relating to particular specimens, are produced on the obverse side of the slide, that is, the side facing the optics of a microscope when inserted therein, they become obscured when a specimen covers them and fills in the roughness caused by the etching or sand blasting employed to produce the frosted indicia. This reduces the effectiveness of such markings and makes them difficult to observe both during placing the specimen on the slide and also during later use of the slide for diagnosticate or classification work.

It is the principal object of the present invention to prevent such indicia from so becoming obscured by being covered by a fluid specimen, this being achieved by etching or sand blasting the indicia on the reverse side of the slide.

It is another object to preserve the ready writability of such slides by providing a frosted or roughened surface for writing on the obverse side of the slide.

In the accompanying drawings, FIG. 1 is a perspective view, from the obverse side, of a slide embodying the invention. FIG. 2 is a top plan view thereof. FIGS. 3 and 4 are enlarged fragmentary sections taken on the correspondingly numbered lines of FIG. 2.

The microscope slide of the present invention comprises a flat transparent strip 5, as of glass, having an obverse side 6 and a reverse side 8, the obverse side 6 being that facing the optics of a microscope (not shown) when inserted therein. Preferably one end area 6a of the obverse side 6 is frosted so that when the specimens are applied, they can be identified as a group by a pencil written designation on this end area 6a which has sufficient tooth to accept and retain hand written markings. The remaining surface 6b of the obverse face 6 is smooth and shiny and is shown as adapted for the placement of three uniformly spaced specimens 9, 10 and 11 thereon.

The areas for such placement of these specimens are delineated by frosted or roughened stripes 8a on the slide, but it is a feature of the invention that these stripes are placed on the reverse side 8 of the slide and not on its obverse side 6. These stripes 8a are shown as evenly spaced to provide three uniform specimen placement areas of the same size.

It is also desirable to specifically identify and distinguish from one another the fluid specimens 9, 10 and 11 placed on the slide. To this end a symbol, such as the letter V, can be produced on the reverse side 8 below one placement area, another symbol, such as the letter C, can be produced on the reverse side 8 below another placement area, and another symbol, such as the letter E, can be produced on the reverse side 8 below the third placement area. All these symbols are indicia in the form of frosted or roughened areas produced by sand blasting or etching at the same time as the areas 6a and 8a. The letters V, C and E can represent vaginal, cervical and endocervical smears, respectively, this being purely exemplary.

In use, the areas to receive the smears are delineated by the stripes 8a and the name of the smear to be placed on each area is designated by the symbol V, C or E and all of such indicia are clearly visible from the obverse side 6 of the slide. However, should a smear cover any part of this indicia, the indicia will not be obscured since the indicia are on the reverse side 8 and hence the smears cannot run into and fill their roughness as is the case where such frosted or rough surface indicia are produced by etching or sand blasting on the obverse side of the slide.

At the same time the frosted or rough surface writing area 6a is preserved on the obverse side of the slide.

I claim:
1. A microscope slide, comprising a flat transparent strip having areas on its obverse side, facing the optics of the microscope when inserted therein, adapted to receive fluid specimens for study in the microscope, and a plurality of indicia in the form of integral rough frosted surfaces on the reverse side of said strip, and visible therethrough and severally relating to information concerning said specimens, whereby no part of said indicia is obscured by having its rough surfaces filled in by the material of said specimens placed on the obverse side of the slide, said indicia being in the form of at least one stripe delineating said areas whereby said information concerns locating said specimens on the observe side of said strip, and in the form of different symbols naming specific specimens whereby said information concerns the specific location of different types of specimens on the obverse side of said strip.
2. The combination set forth in claim 1 wherein said observe side includes an additional area at one end of said strip and having a rough integral surface capable of being written on to identify the strip.

References Cited
UNITED STATES PATENTS

| | | | |
|---|---|---|---|
| 1,996,141 | 4/1935 | Broadhurst et al. | 350—94 |
| 2,801,568 | 8/1957 | Dakin | 350—92 |
| 2,965,219 | 12/1960 | Rhodin. | |
| 3,005,375 | 10/1961 | Sherman | 350—95 |
| 3,350,979 | 11/1967 | Detweiler | 350—94 X |

DAVID SCHONBERG, Primary Examiner

T. H. KUSMER, Assistant Examiner

U.S. Cl. X.R.
356—244